United States Patent [19]
Hayashi

[11] Patent Number: 5,603,654
[45] Date of Patent: Feb. 18, 1997

[54] METHOD FOR SUPPLYING A POLISHING LIQUID AND POLISHING METHOD USING THE SAME

[75] Inventor: Yoshihiro Hayashi, Tokyo, Japan

[73] Assignee: NEC Corporation, Tokyo, Japan

[21] Appl. No.: 387,167

[22] Filed: Feb. 13, 1995

[30] Foreign Application Priority Data

Feb. 14, 1994 [JP] Japan ................................. 6-017089

[51] Int. Cl.$^6$ ........................................................ B24B 1/00
[52] U.S. Cl. ......................................... 451/36; 451/60
[58] Field of Search ................................ 451/36, 41, 60, 451/446

[56] References Cited

U.S. PATENT DOCUMENTS

| | | |
|---|---|---|
| 3,500,591 | 3/1970 | Gawronski et al. ............... 451/60 X |
| 3,638,366 | 2/1972 | Gamache ........................... 451/446 X |
| 4,059,929 | 11/1977 | Bishop . | |
| 4,435,247 | 3/1984 | Basi et al. . | |

FOREIGN PATENT DOCUMENTS

| | | |
|---|---|---|
| 0031204 | 7/1981 | European Pat. Off. . |
| 0520109 | 12/1992 | European Pat. Off. . |
| 51-28295 | 3/1976 | Japan . |
| 2-172666 | 7/1990 | Japan ............................. 451/60 |
| 4-75338 | 3/1992 | Japan . |
| 5-315308 | 11/1993 | Japan . |
| 1042968 | 9/1983 | U.S.S.R. .......................... 451/446 |
| 2247892 | 3/1992 | United Kingdom . |

Primary Examiner—Timothy V. Eley
Attorney, Agent, or Firm—Young & Thompson

[57] ABSTRACT

The invention provides a novel method of supplying a polishing liquid onto a surface of a polishing pad with which a surface of a film is polished wherein a solution including an aggregation agent and a slurry into which fine polishing particles were already dispersed are separately supplied onto the polishing surface so that the slurry is mixed with the solution to thereby cause an aggregation of the fine polishing particles to form aggregated particles to be used for polishing.

22 Claims, 2 Drawing Sheets

METHOD FOR SUPPLYING A POLISHING LIQUID AND POLISHING METHOD USING THE SAME

BACKGROUND OF THE INVENTION

The present invention provides a method of polishing a film by supplying a liquid on a surface of the film to be polished, and to method of adding a polishing liquid on a surface of the film.

The formation of the three-dimensional multilevel interconnections requires a planerization of the surface of the inter-layer insulator such as silicon oxide film. An aluminium wiring layer as a first bottom layer is formed thereafter a silicon oxide film is deposited by a chemical vapor deposition on the first layer. As a result, the silicon oxide film has an irregularity due to the aluminium wiring layer. When forming a second aluminium wiring layer on the irregular surface of the silicon oxide film through photolithography and dry etching processes, problems arise as to difficulty in focusing for exposure to be used for photo-resist pattern and as to difficulty in removal by dry etching of unnecessary part of the aluminium layer to form the second aluminium wiring layer. To solve these problems, it was proposed to conduct a polishing of a surface of the silicon oxide film before the aluminium wiring layer is formed thereon. This is disclosed in the Japanese Patent Application No. 4-94677. The polishing of the silicon oxide film is carried out by a chemical etching function and a mechanical friction function of polishing particles. As disclosed in the Japanese laid-open patent publication No. 4-5338, a polishing liquid is used wherein silica particles having a diameter of 20 nanometers are dispersed into an ammonium solution at 10 to 30 wt %.

Shortening the polishing time requires a high polishing speed which further requires large size silica particles. The use of the large size silica particles may result in damage to the surface of the film polished. Further, as illustrated in FIG. 1, the large silica particles give rise to the problem of a high speed precipitation thereof whereby a continuous stirring of the liquid is required. The continuous stirring of the liquid requires the polishing apparatus to be provided with a stirring system thereby resulting in a complicated structure of the polishing apparatus.

On the other hand, as disclosed in the Japanese laid-open patent publication No. 51-28295, when fine silica particles are used for polishing, there is no damage to the polishing surface, but there is a problem as to a low speed of the polishing.

A method of increasing a polishing speed without use of a large size polishing particle was proposed wherein an aggregation agent of an electrolytic salt is added into a slurry to cause an aggregation of silica particles to form large size aggregated particles to be used for polishing as illustrated in FIG. 2. This method is, however, has the disadvantage the necessity conduct a continuous stirring of the polishing liquid.

SUMMARY OF THE PRESENT INVENTION

Accordingly, it is a general object of the present invention to provide a novel method of polishing a film by supplying a polishing liquid free from any problems or disadvantages as described above.

It is a further object of the present invention to provide a novel method of polishing a film at a high speed.

It is a furthermore object of the present invention to provide a novel method of polishing a film without stirring a polishing liquid.

It is a moreover object of the present invention to provide a novel method of polishing a film without causing damage to the film.

The above and other objects, features and advantages of the present invention will be apparent from the following descriptions.

The invention provides a novel method of supplying a polishing liquid onto a surface of a polishing pad with which a surface of a film is polished, wherein a solution including an aggregation agent and a slurry into which fine polishing particles were already dispersed are separately supplied onto the polishing surface so that the slurry is mixed with the solution to thereby cause an aggregation of the fine polishing particles to form aggregated particles to be used for polishing.

BRIEF DESCRIPTIONS OF THE DRAWINGS

Preferred embodiments of the present invention will hereinafter fully be described in detail with reference to the accompanying drawings.

PREFERRED EMBODIMENTS OF THE INVENTION

The invention provides a novel method of supplying a polishing liquid onto a surface of a film to be polished by a polishing apparatus wherein a solution including an aggregation agent and a slurry into which fine silica particles were already dispersed are separately supplied onto the polishing surface so that the slurry is mixed with the solution to thereby cause an aggregation of the fine silica particles to form aggregated particles to be used for polishing.

An apparatus for practicing the method comprises a polishing unit having a plate provided thereon with a polishing pad on which the film is polished, a slurry supplying system for storing and supplying a surface of the polishing pad with a slurry into which fine silica particles are dispersed and an aggregation agent solution supplying system for storing and supplying a solution including an aggregation agent on the surface of the polishing pad so that the slurry is mixed with the solution to thereby cause an aggregation of the fine silica particles to form aggregated particles to be used for polishing.

The fine silica particles are stored in a slurry tank. The fine silica particles are not precipitated due to their small size. This results in no need to stir the slurry in the tank. The slurry is transmitted onto the surface of the polishing pad separately from the solution including the aggregation agent and then on the polishing pad surface the slurry is mixed with the solution including the aggregation agent to thereby cause an aggregation of the fine silica particles involved in the slurry and subsequently aggregated silica particles are formed to serve as polishing particles for polishing the film.

Figure 3:
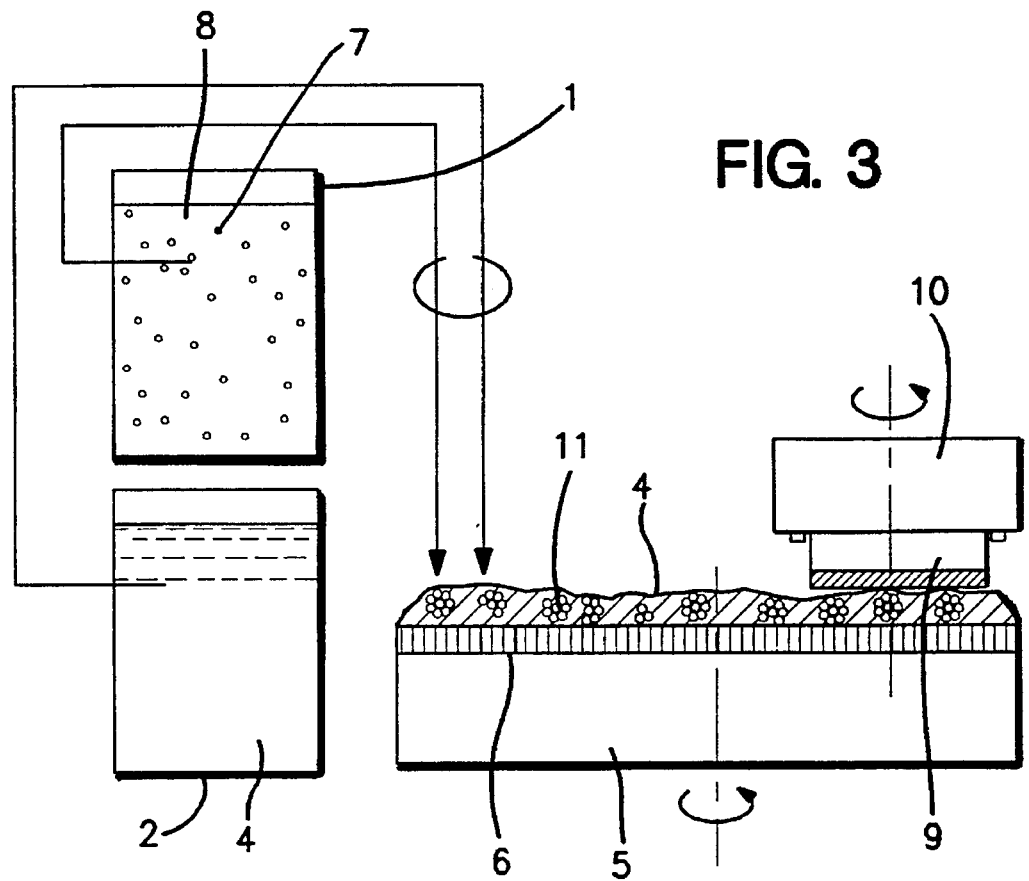
FIG. 3 is a view illustrative of a novel method and apparatus of polishing a film in a preferred embodiment according to the present invention.

The aggregated silica particles have a sufficiently large diameter for achieving a high speed polishing but a flexibility capable of preventing any damage to a surface of the film to be polished. The flexibility is caused by an electric force combining the fine silica particles. By contrast, the use of the large size silica particles used in the conventional method provides a damage into the surface of the film to be polished, As illustrated in FIG. 3, the novel polishing apparatus is provided with a slurry tank 1 for storing a slurry 8 and an aggregation agent solution tank 2 for storing an electrolytic solution 4. The slurry 3 and the electrolytic solution 4 are supplied by pump onto a surface of a polishing pad 6 formed on a polishing plate 5. A silicon oxide film formed on a semiconductor substrate 9 fixed on a substrate 10 is polished on the surface of the polishing pad 6.

In the slurry 8 tank 1, a slurry is stored as a suspension liquid wherein 10 to 40 wt % of fine silica particles 7 is dispersed into a pure water or an alkyl solution of 8 to 9 pH The silica particles have a diameter in the range from 10 to 100 nanometers to prevent precipitation of the particles from the slurry 3. Considering the alkyl metal pollution to the semiconductor process line, it is not preferable to use alkyl metals such as NaOH or KOH dissolved in pure water to prepare the alkyl solution of 8 to 9 pH. If anything, it is preferable to use non-alkyl metals such as ammonia or amine.

In the aggregation agent solution tank 2, a solution including 0.3 mol/l of ammonium acetate is stored. It is preferable to use, as an electrolytic salt, ammonium salts such as ammonium nitrate or ammonium chloride. NaCl or KCl are also available.

From the aggregation agent solution tank 2, the solution including 0.3 mol/l of the ammonium acetate is withdrawn and dropped onto the surface of the polishing pad 6 at a dropping rate, of 20 ml/min. The slurry including 30 wt % of fine silica particles is then adjusted with addition of ammonia to have a 9 to 10 pH and subsequently withdrawn and dropped onto the surface of the polishing pad 6 at a dropping rate of 40 ml/min. As a result, the dropped slurry is mixed on the surface of the polishing pad 6 with the aggregation agent solution to thereby cause an aggregation of fine silica particles involved in the slurry and then aggregated silica particles 11 are formed to act as polishing particles with a large diameter for allowing a high speed polishing and with a flexibility protecting the surface of the film from any damage in polishing thereof. On the surface of the polishing pad 6, a silica concentration is 20 wt % and a concentration of ammonium acetate is 0.1 mol/l thereby 10 to 50 of the fine silica particles having a diameter of about 20 nanometers are aggregated an aggregated particle 11 having a diameter of 200 to 1000 nanometers.

Figure 1:
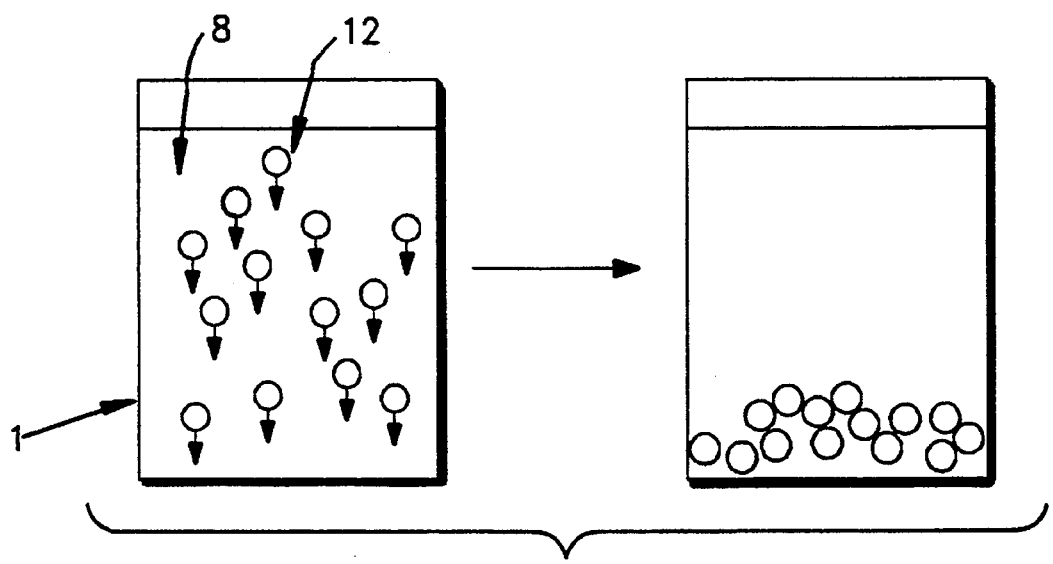
FIG. 1 is a view illustrative of the conventional polishing method by use of large size silica particles.
Figure 4:
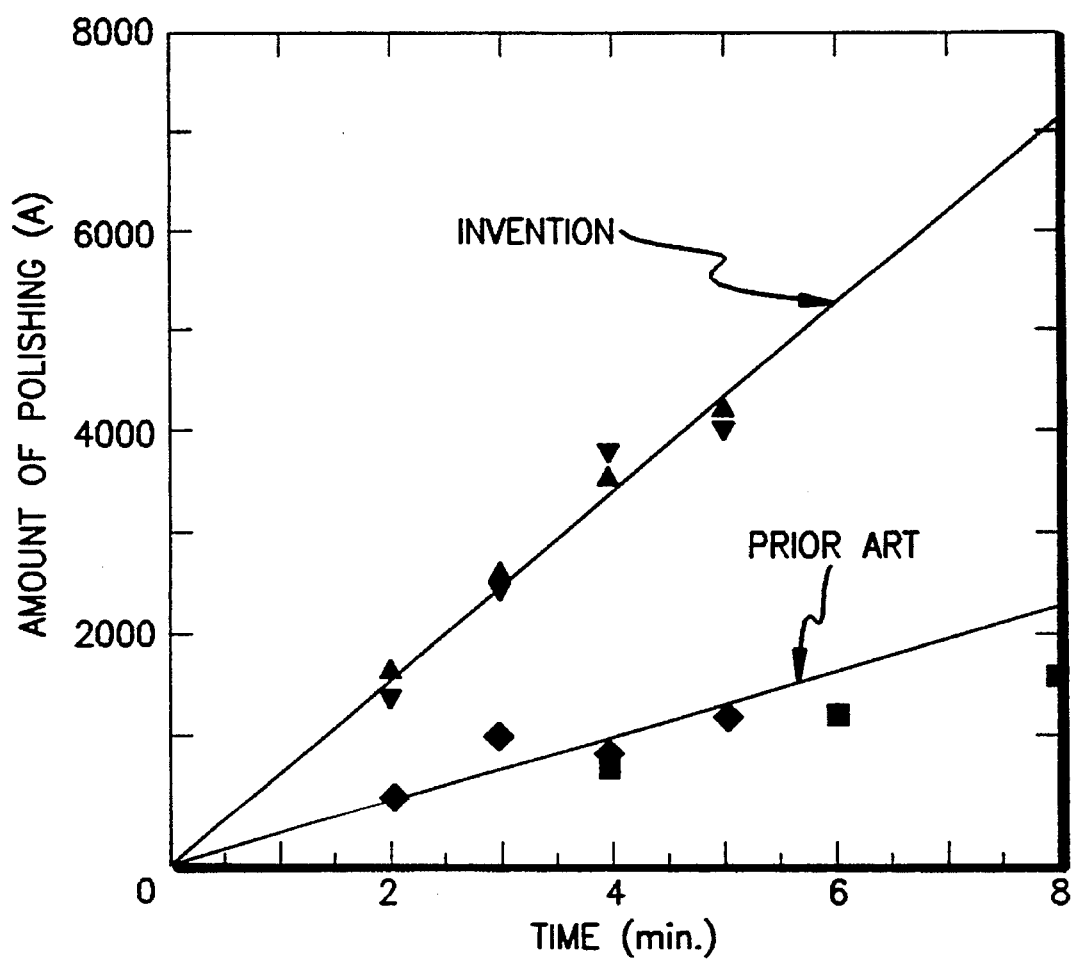
FIG. 4 is a diagram illustrative of polishing speeds in the conventional and novel methods.
Figure 2:
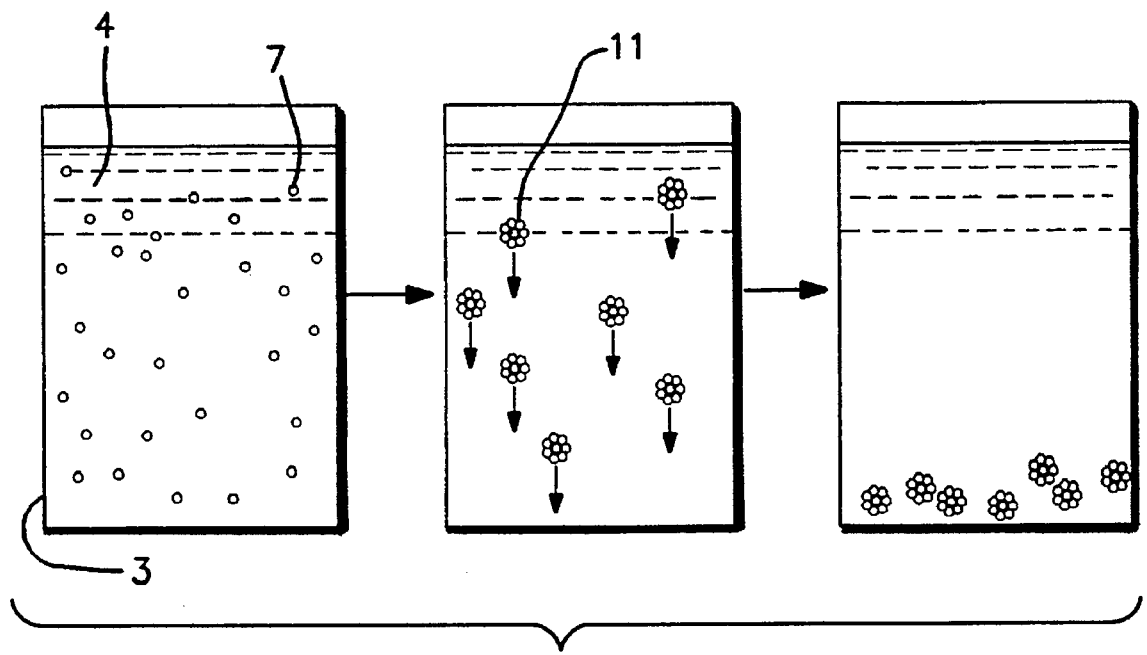
FIG. 2 is a view illustrative of the other conventional polishing method by use of the aggregated silica particles.

FIG. 4 illustrates a polishing rate or a polishing amount versus a polishing time under the condition of a polishing pressure of 0.4 kg/cm$^2$ and a rotation speed of 35 rpm. When the slurry only is used, then the polishing speed is 300 A/min. By contrast, when the slurry is dropped together with the solution including ammonium acetate, then the polishing speed is increased up to 900 A/min.

To check for damage, by the use of a laser a particle checker is used to detect the micro-scratch on the polished surface. The used checker is able to detect a micro-scratch with a width not less than 0.3 micrometers. Even the micro-scratch, if existing, may be detectable as a scratch like line, but no micro-scratch was detected.

Although in the foregoing embodiment silica particles are used as the polishing particles, alumina particles or cerium oxide particles are also available. When the alumina particles are used by dispersing the same into a slurry, the preferable pH value is in the range from 3 to 5. In any event, the pH value has to be controlled to prevent any aggregation of the fine particles in the slurry in the slurry tank.

The above novel method is needless to say applicable to polishing of not only the silicon oxide film but also other films such as silicon nitride film, a boron phosphate silicate glass film, aluminium film, copper film and a tungsten film.

From the above descriptions, it is to be understood that the present invention allows a high speed polishing without providing any damage to the polishing surface of the film and a shortening of the polishing time as well as a reduction of the manufacturing cost.

Whereas modifications of the present invention will no doubt be apparent to a person having ordinary skill in the art to which the invention pertains, it is to be understood that embodiments shown and described by way of illustration are by no means intended to be considered in a limiting sense. Accordingly, it is to be intended to cover by claims all modifications of the present invention which fall within the sprit and scope of the invention.

What is claimed is :

1. A method of supplying a polishing liquid onto a surface of a polishing pad with which a surface of a film is to be polished, comprising separately supplying to a polishing pad surface a solution including an aggregation agent and a slurry into which fine polishing particles were already dispersed so that the slurry is mixed with the solution to thereby cause an aggregation of the fine polishing particles to form aggregated particles to be used for polishing.

2. The method as claimed in claim 1, wherein a pH value of said slurry is controlled to suppress any generation of aggregation of said fine polishing particles until the slurry is mixed with said solution on said polishing pad surface.

3. The method as claimed in claim 1, wherein said slurry comprises a suspension liquid with a non-alkyl metal compound and fine polishing particles.

4. The method as claimed in claim 3, wherein said non-alkyl metal compound comprises ammonia.

5. The method as claimed in claim 3, wherein said non-alkyl metal compound comprises amine.

6. The method as claimed in claim 1, wherein said polishing particles comprise silica particles.

7. The method as claimed in claim 1, wherein said polishing particles comprise silica particles.

8. The method as claimed in claim 1, wherein said polishing particles comprise cerium oxide particles.

9. The method as claimed in claim 1, wherein said aggregation agent comprises an electrolytic salt.

10. The method as claimed in claim 9, wherein said electrolytic salt comprises ammonium nitrate.

11. The method as claimed in claim 9, wherein said electrolytic salt comprises ammonium chloride.

12. A method of polishing a film, comprising supplying a polishing liquid onto a surface of a polishing pad by separately supplying to the pad a solution including an aggregation agent and a slurry into which fine polishing particles were already dispersed so that the slurry is mixed with the solution to thereby cause an aggregation of the fine polishing particles to form aggregated particles on the pad, and thereafter polishing said film with said pad.

13. The method as claimed in claim 12, wherein a pH value of said slurry is controlled to suppress any generation of aggregation of said fine polishing particles until the slurry is mixed with said solution on said polishing pad surface.

14. The method as claimed in claim 12, wherein said slurry comprises a suspension liquid with a non-alkyl metal compound and fine polishing particles.

15. The method as claimed in claim 14, wherein said non-alkyl metal compound comprises ammonia.

16. The method as claimed in claim 14, wherein said non-alkyl metal compound comprises amine.

17. The method as claimed in claim 12, wherein said polishing silica particles.

18. The method as claimed in claim 12, wherein said polishing particles comprise alumina particles.

19. The method as claimed in claim 12, wherein said polishing particles comprise cerium oxide particles.

20. The method as claimed in claim 12, wherein said aggregation agent comprises an electrolytic salt.

21. The method as claimed in claim 20, wherein said electrolytic salt comprises ammonium nitrate.

22. The method as claimed in claim 20, wherein said electrolytic salt comprises ammonium chloride.

* * * * *